United States Patent [19]

Iizuka et al.

[11] Patent Number: 5,315,585
[45] Date of Patent: May 24, 1994

[54] ECHO CANCELLER USING TWO RESIDUAL ECHOES

[75] Inventors: Shigeru Iizuka, Saitama; Youtaro Yatsuzuka, Kanagawa, both of Japan

[73] Assignee: Kokusai Denshin Denwa Co., Ltd, Tokyo, Japan

[21] Appl. No.: 53,658

[22] Filed: Apr. 29, 1993

[30] Foreign Application Priority Data

May 15, 1992 [JP] Japan ................. 4-147963

[51] Int. Cl.$^5$ ............................................ H04L 5/14
[52] U.S. Cl. ................... 370/32.1; 379/410; 379/406
[58] Field of Search ............... 370/32.1, 32; 379/406, 379/408, 410, 411, 407; 364/724.19, 724.16

[56] References Cited

U.S. PATENT DOCUMENTS

| | | | |
|---|---|---|---|
| 4,117,277 | 9/1978 | Elzen et al. | 379/406 |
| 4,972,406 | 11/1990 | Dedic | 370/32.1 |
| 4,995,104 | 2/1991 | Gitlin | 370/32.1 |
| 5,029,204 | 7/1991 | Shenoi et al. | 379/410 |
| 5,193,112 | 3/1993 | Sano | 370/32.1 |
| 5,263,020 | 11/1993 | Yatsuzuka et al. | 370/32.1 |

OTHER PUBLICATIONS

"A Cascadable VLSI echo Canceller", Tao et al, IEEE Journal on Selected Areas in Communications, vol. SAC-2, No. 2, Mar. 1984, pp. 297-303.
"Echo Canceler with Two Echo Path Models", Ochiai et al, IEEE Transactions on Communicaitons, vol. COM-25, No. 6, Jun. 1977, pp. 589-595.

*Primary Examiner*—Douglas W. Olms
*Assistant Examiner*—Chau T. Nguyen
*Attorney, Agent, or Firm*—Nikaido, Marmelstein Murray & Oram

[57] ABSTRACT

In an echo canceller having PCM interfaces used in a PCM telephone circuit, an echo estimator (6) is coupled with a receive path through a linear code converter (13) for obtaining a linear receive input signal, and a first subtractor (7) is inserted after a linear code converter (13) in a transmit path for cancelling an echo component in a linear transmit input signal and for transmitting a first residual echo to the far-end talker. A non-linear quantization processor (24) is inserted between the first subtracter (7) and the echo estimator (6), and produces a new echo estimate containing quantization noise, based on an echo estimate which is derived from the echo estimator (6). The filter coefficients in the echo estimator (6) are updated by using the second residual echo obtained by the second subtracter (23) separately prepared from the first subtracter (7). The new echo estimate from the non-linear quantization processor (24) can drastically cancel not only the echo but also the quantization noise in the linear transmit input signal without any effect on the performance of the echo estimator (6). The echo canceller having the non-linear quantization processor (24) and subtracters separately prepared for transmitting the first residual echo to the far-end talker and for updating the echo estimator (6) can achieve a high echo return loss enhancement even for a multi-linked PCM channel.

6 Claims, 12 Drawing Sheets

ECHO CANCELLER USING TWO RESIDUAL ECHOES

FIELD OF THE INVENTION

The present invention relates to an echo canceller for a PCM telephone channel, and/or an acoustic channel in tele-conferences or TV conferences.

BACKGROUND OF THE INVENTION

In a telephone channel having a four-wire long distance PCM trunk, hybrid circuits are connected for 2wire-4wire conversion. The hybrid circuits at each end of a call interface two-wire subscriber loops to the four-wire long distance PCM trunk. The near-end echo of a far-end talker on the transmit path through a hybrid circuit is returned to the talker who perceives it as an echo.

FIG. 1 shows the basic structure of a conventional echo canceller with 64 kbit/s PCM interfaces for cancelling the echo in a PCM telephone channel. The input and output signals of the echo canceller (1) are assumed to be digitized with either 8-bit $\mu$- or A-law PCM and are processed digitally. The 8-bit PCM receive input signal Rin from the far-end talker is fed to a receive input port (2). The 8-bit PCM transmit input signal Sin at a transmit input port (5) is returned as the near-end echo over the echo path including at least a PCM coder (16) and a PCM decoder (15), which corresponds to a circuit from a receive output port (3) to the transmit input port (5) through the hybrid circuit (4). The 8-bit PCM receive output signal Rout from the port (3) is decoded to an analog signal through the PCM decoder (15). The hybrid circuit (4) transmits the analog signal through a port (17) to the near-end talker. A part of the analog signal at the hybrid circuit (4) is leaked as an echo to the transmit path and is encoded through the PCM coder (16). The conventional echo canceller (1) synthesizes a replica of the near-end echo by an echo estimator (6) and suppresses the echo by subtracting this replica at a subtracter (7) from a linear transmit input signal, which is converted from the 8-bit PCM transmit input signal Sin through a linear code converter (13). A residual echo derived as an output of the subtracter (7) is fed to a center clipper (8) as a non-linear unit to clip the residual echo having a level lower than a given threshold, and/or is converted to a 8-bit PCM code through a non-linear code converter (14) to be transmitted from the transmit output port (9) of the echo canceller (1) having a 64 kbit/s PCM interface.

A double talk detector (10) is provided for detecting the double talk situation between the near- and far-end talkers, and a low level detector (11) is also provided for detecting a linear receive input signal having a level lower than a given threshold derived through a linear code converter (12). In the double talk detector (10), levels of the linear transmit input signal and the linear receive input signal are compared to detect the double talk situation.

In the echo estimator (6) which comprises an adaptive digital transversal filter having a finite impulse response (FIR), filter coefficients of the filter are adaptively updated according to the residual echo and the linear receive input signal stored in the echo estimator (6) so as to minimize the level of the residual echo either at every sample time or at every sample interval. The updating of the filter coefficients is inhibited during double talking or during the period when the low level detector (11) detects a linear receive input signal having a low level.

In the case of an echo canceller having PCM interfaces so as to connect it with the PCM telephone channel, the quantization noise is always induced by the non-linear process of the PCM codecs (15,16) in the echo path, resulting in degraded performance of the echo cancellation. Because the quantization noise in the linear transmit input signal is independent of the linear receive input signal, it cannot be estimated by the echo estimator (6) which uses only the linear processing by the FIR filter. The updating of the filter coefficients in the echo estimator (6) by the residual echo containing the quantization noise also results in a deviation of the impulse response of the echo estimator (6) from the optimum, inducing a degradation of the echo cancellation performance. The echo cancellation performance is limited by the amount of the quantization noise.

In a multi-linked PCM telephone channel, PCM codecs are inserted after the PCM decoder (15) and/or before the PCM coder (16) in the echo path. The tandem connection of the PCM codecs produces a large amount of the quantization noise relative to the number of PCM codecs. When a low rate codec like a 32 kbit/s ADPCM or a codec having a rate lower than 16 kbit/s is applied instead of the PCM codec, a larger amount of quantization noise is produced by the codec. Thus, the echo cancellation performance always degrades due to a PCM tandem connection or a low rate codec connection. This degradation cannot be avoided by using only the linear processes in a conventional echo canceller. It is therefore very difficult for the echo canceller (1) to achieve a high echo cancellation performance under these circumstances.

FIG. 2 shows a conventional acoustic echo canceller (40) used in a tele-conference or a TV conference. A linear receive input signal and a transmit input signal are directly fed to the receive input port (2) and the transmit input port (5), respectively. A linear receive output signal Rout at the port (3) is fed to a speaker at the port (172) after converting it to an analog acoustic signal through a D/A converter (18). An analog acoustic signal at a port (171) from a microphone is also converted to a linear transmit input signal through an A/D converter (19). A part of the analog acoustic signal from the speaker is also fed to the A/D converter (19) in the transmit path through the microphone as an echo in the echo path.

The A/D and D/A converters (18,19) induce a quantization noise which cannot be cancelled by the acoustic echo canceller (40) due to non-linear processing as in the PCM echo canceller mentioned above. If the length of a quantization bit in the A/D and D/A converters (18,19) is short, a large amount of quantization noise is produced, resulting in a degradation of acoustic echo cancellation. A longer bit length requires a huge amount of processing in the acoustic echo canceller having a very high sampling frequency due to a wide transmission bandwidth and a long echo path delay.

FIG. 3 is a basic structure of another echo canceller (50) having a non-linear quantization processor to reduce the quantization noise in the linear transmit output signal for a PCM telephone channel as described in U.S. Pat. No. 5,247,512. The echo canceller (50) can cancel the quantization noise when the echo estimate (6) successfully converges to provide an accurate echo estimate.

The echo canceller (50) comprises an echo estimator (6); a non-linear quantization processor (20) for generating a new echo estimate containing a quantization noise as the output corresponding to the echo estimate from the echo estimator (6); a subtracter (7) for obtaining a residual echo as the linear transmit output signal sent to the far-end; a switch circuit (21) for connecting either the output of the echo estimator (6) or the output of the non-linear quantization processor (20) with the subtracter (7) so as to subtract the output at a first input of the subtracter (7) from the linear transmit input signal at a second input of the subtracter (7); and a switch controller (22). The switch controller (22) controls the switch circuit (21), the non-linear quantization processor (20) and the echo estimator (6).

In the non-linear quantization processor (20), the echo estimate from the echo estimator (6) as an input at the port (201) is converted into a PCM code and then is inverse-converted again to a linear code having a quantization noise as a new echo estimate which is output at a port (202). The non-linear quantization processor (20) can therefore provide a new echo estimate which has the same value as that of the linear transmit input signal including a quantization noise or a value very close to it. In the echo estimator (6), the adaptation speed for the filter coefficient updating is adjusted according to the convergence/divergence state of the echo estimator (6) which is determined by the switch controller (22).

Two processing modes are provided, that is, a linear processing mode and a non-linear processing mode. The processing mode is chosen by the switch controller (22), according to the convergence/divergence state of the echo estimator (6). In the switch controller (22), the power of the linear transmit input signal and the power of the residual echo are calculated for comparison so as to judge the convergence/divergence state in the echo estimator (6) and select either the non-linear or linear modes.

When the switch controller (22) judges the echo estimator (6) to be convergent, the switch controller (22) selects the non-linear processing mode and then controls the switch circuit (21) to connect the non-linear quantization processor (20) to the subtracter (7). The output of the non-linear quantization processor (22) is then supplied through the switch circuit (21) to the first input of the subtracter (7) so as to cancel the echo and the quantization noise in the linear transmit input signal at the second input of the subtracter (7).

In the linear processing mode selected by the switch controller (22) due to divergence in the echo estimator (6), the output of the echo estimator (6) is directly supplied to the subtracter (7) through the switch circuit (21) to obtain the same residual echo as in the conventional echo canceller. The divergent echo estimator (6) cannot provide an echo estimate which is sufficiently accurate for generating an appropriate quantization noise for the linear transmit input signal. The non-linear processor (20) is therefore bypassed by controlling the switch circuit (21) in this mode.

In the initial stage of the echo canceller (50), the linear processing mode is selected due to divergence. After judgement of convergence in the echo estimator (6), the switch controller (22) selects the non-linear processing mode to ultimately cancel the quantization noise in the linear transmit input signal.

During double talking, the switch controller (22) constrains the switch circuit (21) to bypass the non-linear quantization processor (20), as the near-end talker's talkspurt is considerably affected by the non-linear quantization processor (20). The same procedures for the adaptation speed in the echo estimator (6) are executed as those in the above conventional echo canceller in the double talk situation or the low level situation in the linear receive input signal.

FIG. 4 shows a basic configuration of the non-linear quantization processor (20). The non-linear quantization processor (20) comprises a multi-output non-linear quantizer (210) and an optimum echo estimate selector (211). The multi-output non-linear quantizer (210) provides a plurality of quantized echo estimates for the optimum echo estimate selector (211) as candidates for an optimum echo estimate giving a minimum level of the residual echo of the output at the subtracter (7). These candidates of quantized echo estimates include the quantized echo estimate directly corresponding to the echo estimate from the echo estimator (6) through the port (201) and also quantized echo estimates near to it. The optimum echo estimate can be provided as the output of the optimum echo estimate selector (211), giving the minimum level of the residual echo among the candidates.

The non-linear quantization processor (20) can search the optimum echo estimate from a wide range of candidates to reduce the quantization noise in the transmit input signal. The non-linear quantization processor (20) can always suppress the residual echo as much as possible, even if the echo estimate from the echo estimator (6) largely deviates from the linear transmit input signal with incomplete convergence. This means that the deviation of the filter coefficients in the echo estimator (6) cannot be precisely updated by this minimized residual echo so as to make the echo estimator (6) converge rapidly during the incomplete convergence, resulting in incomplete cancellation of large echo and quantization noise. It is thus difficult for the echo canceller (50) to achieve a very rapid convergence in the echo estimator (6) for a large echo and to perform excellent cancellation of echo having a wide dynamic range of levels and quantization noise.

In the above circumstances, no previous echo canceller was able to provide sufficiently high performance with a rapid convergence in the echo estimator (6) and excellent cancellation of the echo having a wide range of levels and the quantization noise. This invention however provides a new echo canceller which can resolve these problems.

SUMMARY OF THE INVENTION

It is an object, therefore, of the present invention to overcome the disadvantages and limitations of a conventional echo canceller.

It is also an object of the present invention to provide an echo canceller which provides excellent and rapid echo cancellation for an echo path having a quantization noise.

The above and other objects are attained by an echo canceller comprising; an echo estimator (6) for synthesizing a replica of the linear transmit input signal; a quantization processor (24,25) for generating a new echo estimate containing an induced quantization noise by quantizing the echo estimate which is derived from the echo estimator (6); and a first subtractor (7) so as to obtain a first residual echo being sent to the far-end by subtracting the new echo estimate at a first input of the subtracter (7) from the linear transmit input signal at a second input of the subtracter (7). The quantization processor (24,25) can provide the new echo estimate which has the same value as that of the linear transmit input signal having the quantization noise or is very close to it, resulting in effective cancellation of both the echo and the quantization noise. A second subtracter (23,231,30) is also provided to obtain a second residual echo which is only applied to update the filter coefficients in the echo estimator (6,61,32).

Rapid and excellent cancellation can be achieved in the echo canceller by using the separate subtracters for obtaining the first residual echo being transmitted to the far-end talker and the second residual echo being used in the echo estimator (6,61,32) and by using a quantization processor (24,25) in which an optimum echo estimate minimizing the level of the first residual echo is chosen from a plurality of candidates with quantization noise derived from the echo estimate of the echo estimator (6,61,32).

BRIEF DESCRIPTION OF THE DRAWINGS

The foregoing and other objects, features, and attendant advantages of the present invention will be better understood by means of the following descriptions and accompanying drawings wherein.

DESCRIPTION OF THE PREFERRED EMBODIMENTS

It is assumed that input and output signals of the echo cancellers are in a 8-bit PCM form in Embodiments 1 to 5 and in a linear form in the Embodiment 6, and that the echo cancellers handle digital signals.

Embodiment 1

Figure 1:
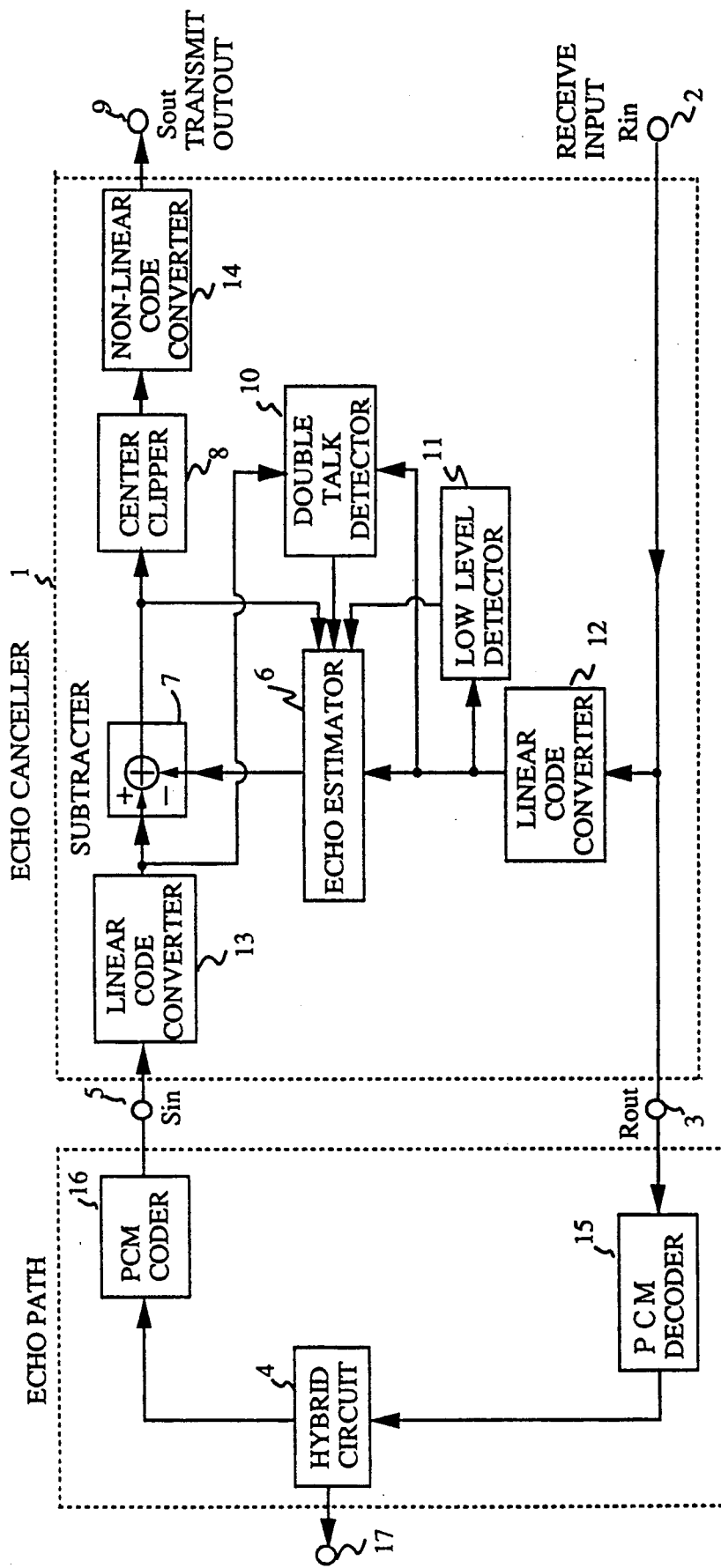
FIG. 1 is a basic structure of a conventional echo canceller (1) for a PCM telephone channel.
Figure 2:
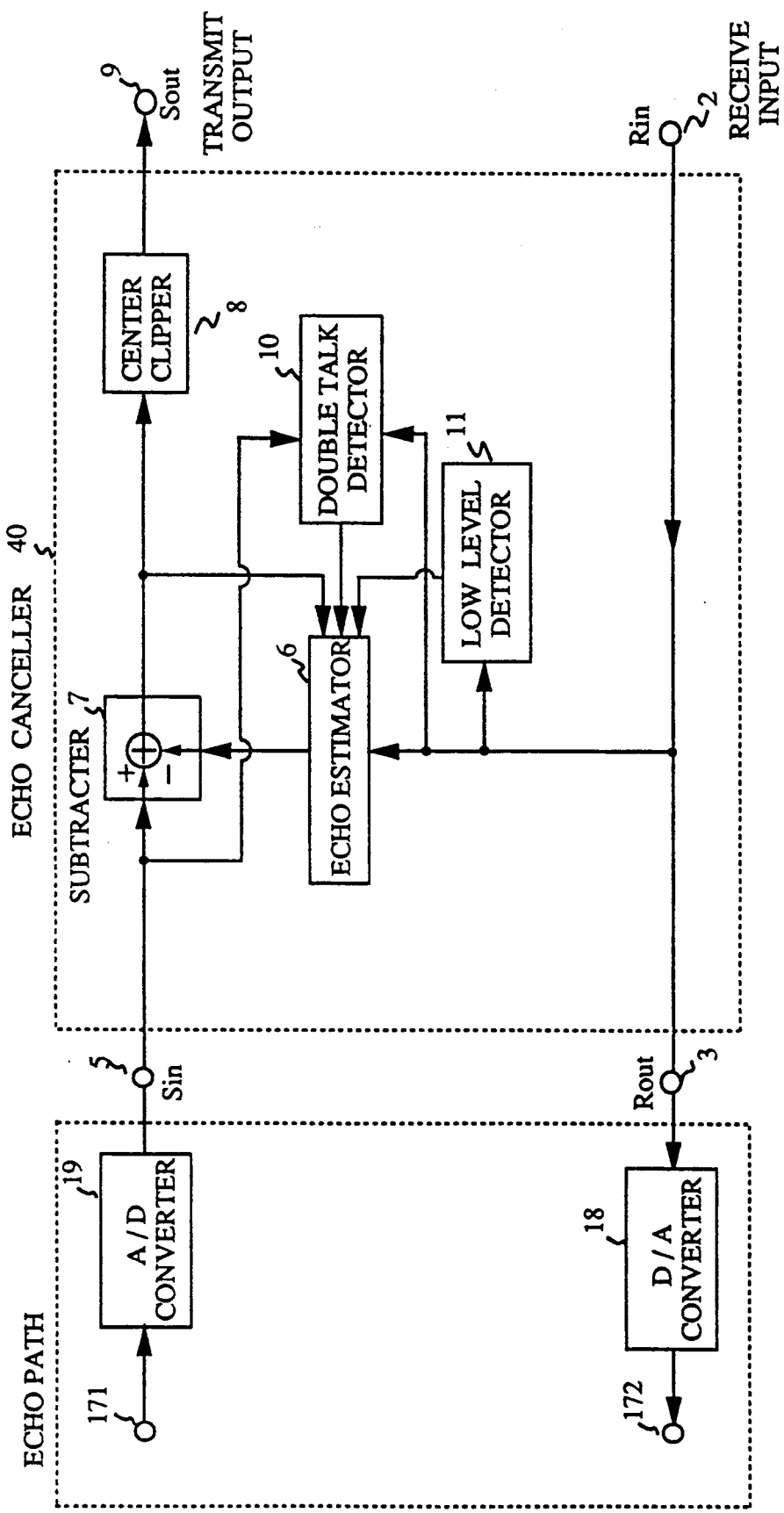
FIG. 2 is a basic structure of a conventional acoustic echo canceller (40) having a linear digital interface.
Figure 3:
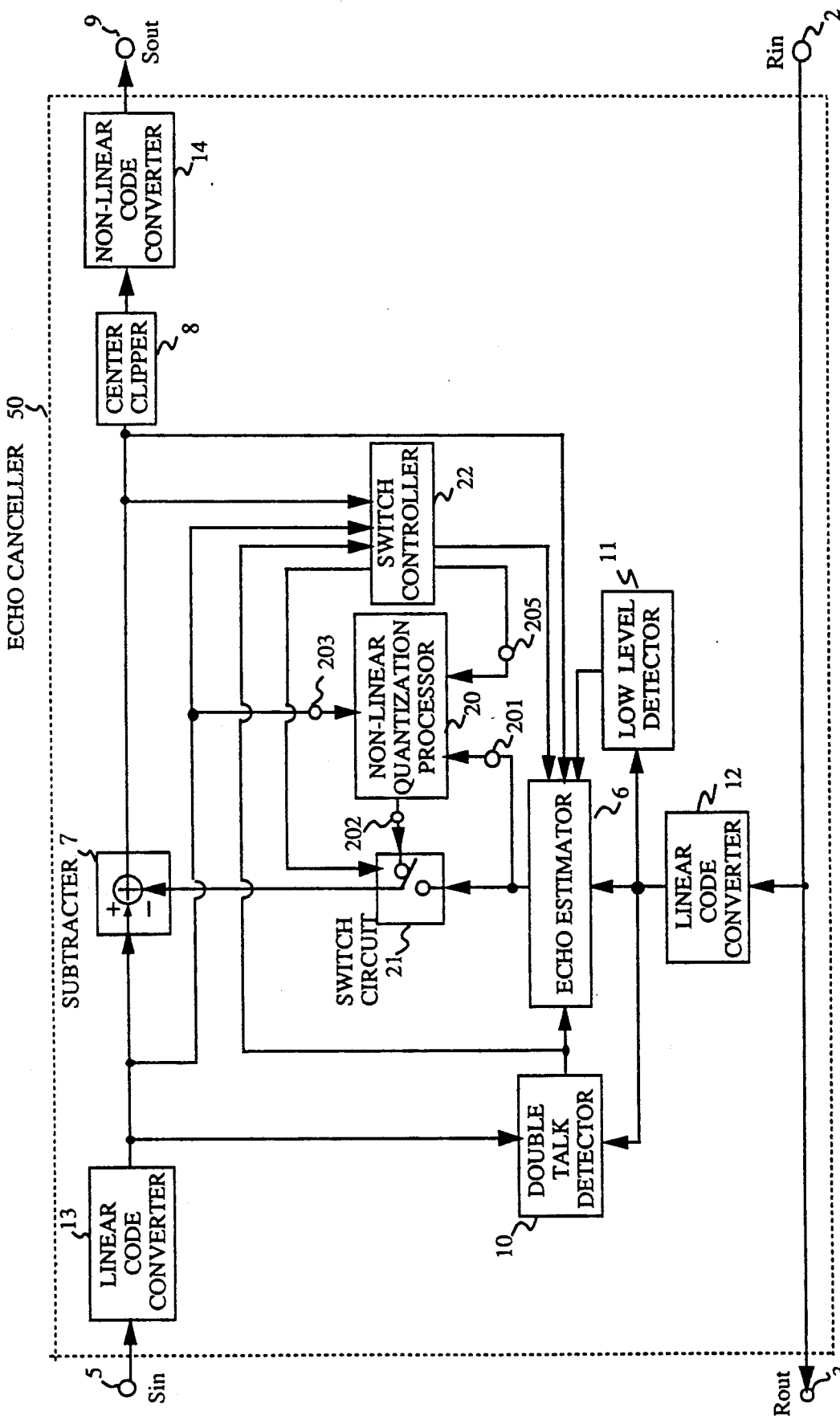
FIG. 3 is a basic structure of another echo canceller (50) having a non-linear quantization processor for a PCM telephone channel under the U.S. Pat. No. 5,247,512.
Figure 4:
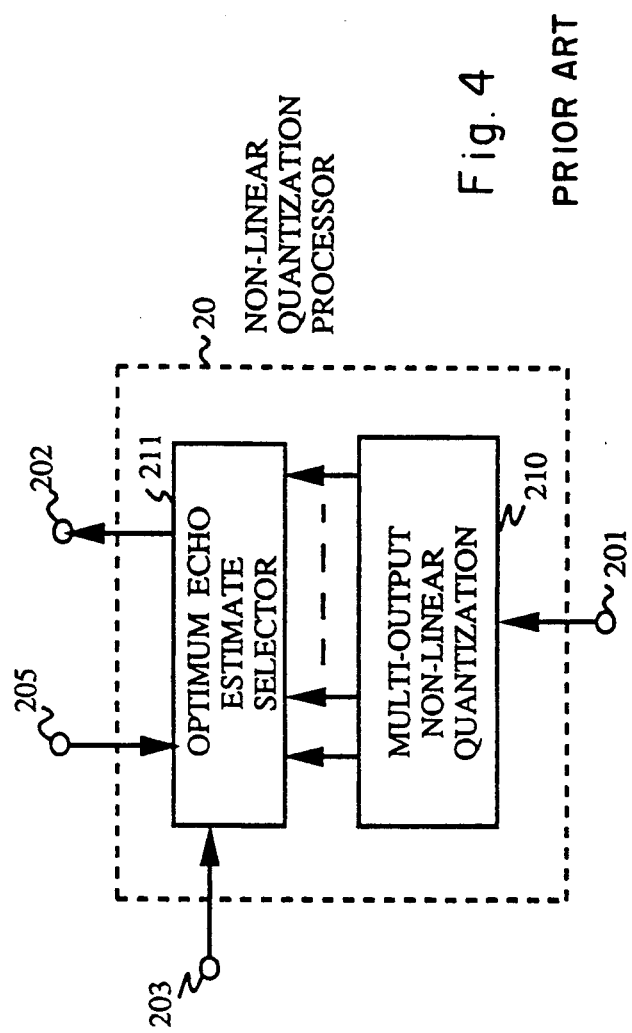
FIG. 4 is a functional configuration of a non-linear quantization processor (20) in the echo canceller (50)
Figure 5:
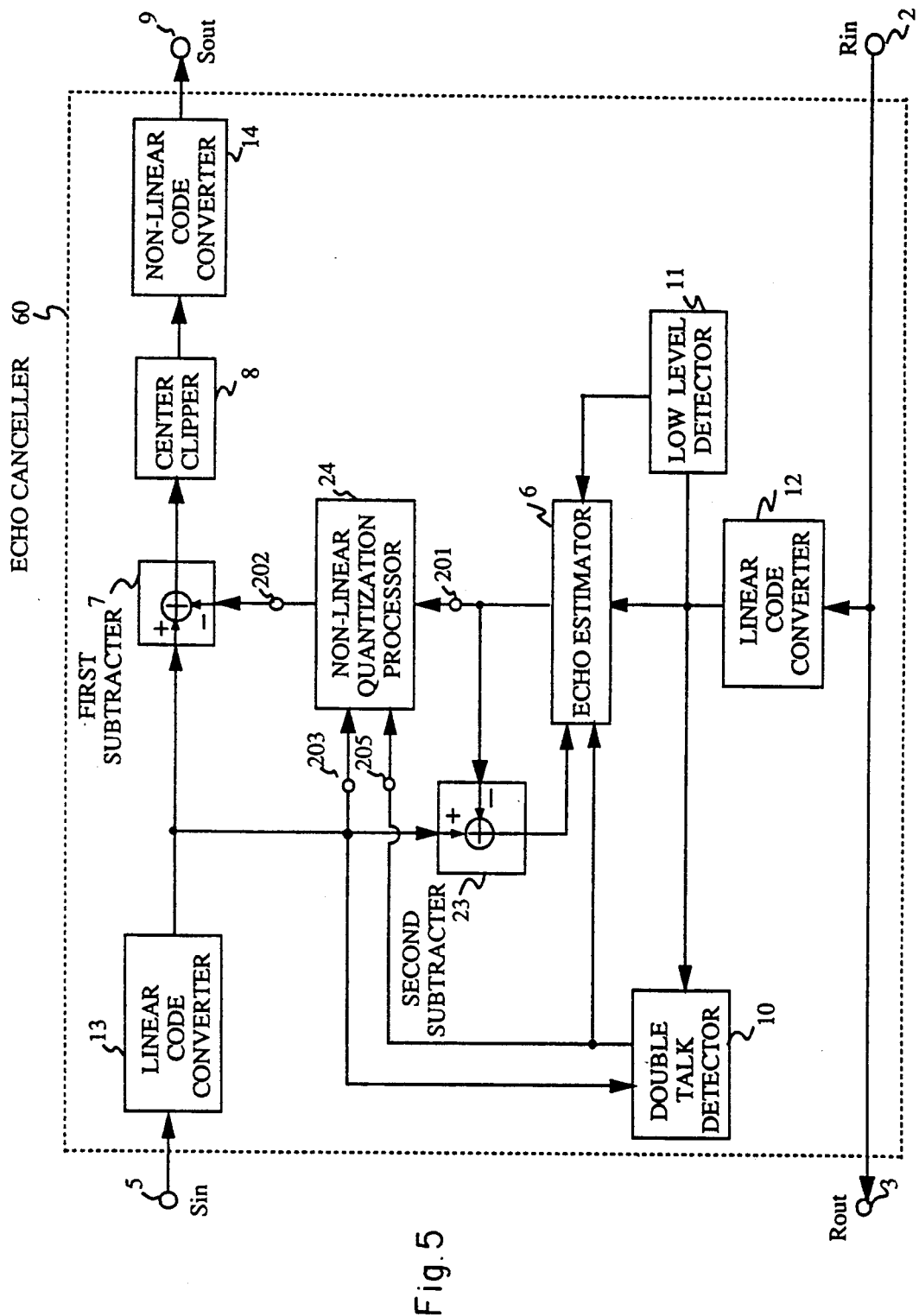
FIG. 5 is a functional configuration of an echo canceller (60) having a PCM interface according to the present invention.

In a first embodiment of the present invention, an echo canceller (60) having PCM interfaces in FIG. 5 can be effectively applied to an echo path having a PCM link. The echo canceller (60) comprises at least: an echo estimator (6) for synthesizing an echo estimate from the linear receive input signal; a non-linear quantization processor (24) for generating a new echo estimate containing a quantization noise for the echo estimate; a first subtracter (7) for obtaining a first residual echo to be sent to the far-end; and a second subtracter (23) for obtaining a second residual echo for updating filter coefficients in the echo estimator (6). At the second subtracter (23), the second residual echo is derived by subtracting the echo estimate from the echo estimator (6) from the linear transmit input signal.

In the non-linear quantization processor (24), the echo estimate from the echo estimator (6) through a port (201) is converted into a PCM code and then is inverse-converted again to a linear code having a quantization noise. The non-linear quantization processor (24) can therefore provide a new echo estimate which has the same value as that of the linear transmit input signal including the quantization noise given through a port (203) or a value very close to it. The output of the non-linear quantization processor (24) is then always supplied to the first subtracter (7) through a port (202) so as to cancel the echo and the quantization noise in the linear transmit input signal.

The echo estimator (6) in which the filter coefficients are updated by the second residual echo from the second subtracter (23) can provide an echo estimate which is sufficiently accurate for generating an appropriate amount of quantization noise so as to cancel the quantization noise or other noises such as an idle noise and a phase roll noise in the linear transmit input signal.

The same procedures for the adaptation speed in the updating of the filter coefficients in the echo estimator (6) are executed as in the double talk situation or the low level situation in the linear receive input signal as in the conventional echo canceller (1). When the double talk situation is detected in a double talk detector (10), the adaptation speed is constrained to be zero in the echo estimator (6) as in the conventional echo canceller (1), and the quantized value of the echo estimate from the echo estimator (6) is constrainedly output through the port (202) as the optimum echo estimate from the non-linear quantization processor (24), according to the control signal from the double talk detector (10) through a port (205). There is accordingly no effect of the non-linear quantization processor (24) on the first residual echo during double talking.

When a low level detector (11) detects that the linear receive input signal is lower than a given threshold, the adaptation speed is also constrained to be zero or a small value as in the conventional echo canceller (1).

Figure 6:
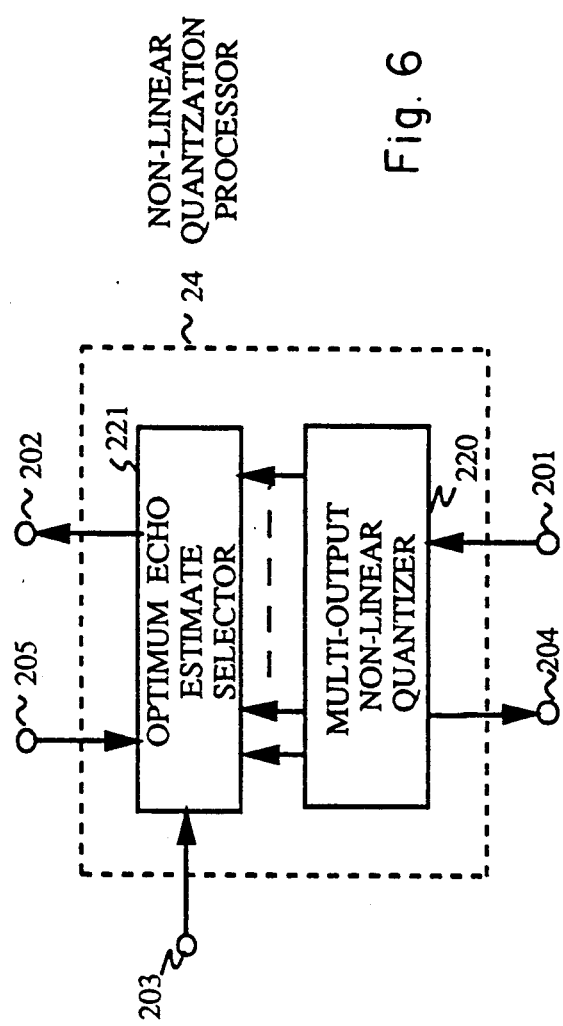
FIG. 6 is a functional configuration of a non-linear quantization processor (24) in the echo canceller (60)

The configuration of the non-linear quantization processor (24) in this embodiment is given in FIG. 6. The non-linear quantization processor (24) has inputs of the linear transmit input signal through a port (203), the echo estimate supplied by the echo estimator (6) through the port (201) and the control signal through the port (205) for the special procedure for obtaining the optimum echo estimate during double talking as mentioned above. The optimum echo estimate is derived as the output of the non-linear quantization processor (24) from the port (202) which is connected to the first subtracter (7). The quantized value of the residual echo from the echo estimator (6) can also be output through the port (204) to supply it to the second subtracter (23), as shown in the second embodiment. The non-linear quantization processor (24) comprises a multi-output non-linear quantizer (220) and an optimum echo estimate selector (221). The multi-output non-linear quantizer (220) provides a plurality of quantized echo estimates for the optimum echo estimate selector (221) as candidates for an optimum echo estimate minimizing the level of the first residual echo. These candidates include the quantized echo estimate directly corresponding to the echo estimate Es from the port (201) and also quantized echo estimates near to it, as in the non-linear quantization processor (20) in the conventional echo canceller (50). A typical example of the plurality of candidates, Ec(j), where j=1, ..., m, from the multi-output non-linear quantizer (220), is given as follows;

$$Esq\{k\} = Q(Es), \quad [1]$$
$$\text{if } k < 1 + (m + 1)/2, k = 1 + (m + 1)/2, \quad [2]$$
$$\text{if } k > 256 - (m + 1)/2, k = 256 - (m + 1)/2, \quad [3]$$
$$Ec(j) = Esq\{k - (m + 1)/2 + j\}, \quad [4]$$

where $Q(z)$ is the quantized output for the input z, k is the output level number of the quantizer corresponding to the echo estimate Es and $1 \leq k \leq 256$, $Esq(r)$ is the quantized output for a level number r, Ec(j) is the j-th candidate, $1 \leq j \leq m$, and m is an odd number of candidates. In this example, quantization step sizes having a continuously distributed level number in the quantizer are allocated to the candidates. Only the quantized echo estimate direcly corresponding to the echo estimate of the echo estimate (6) (m=1) is of cause able to output from the non-linear quantization processor (24).

In the optimum echo estimate selector (221), the optimum echo estimate is chosen from the candidates as follows;

$$Ec(i) = \min_{j=1}^{m} \{|SinL - Ec(j)|; i\}, \quad [5]$$

$$Esopt = Ec(i), \quad [6]$$

where SinL is the linear transmit input signal derived from the linear code converter (13), and Ec(i) is the i-th candidate giving the optimum echo estimate. The optimum echo estimate from the non-linear quantization processor (24) can provide the minimum level of the first residual echo. The non-linear quantization processor (24) can provide a very effective cancellation of both the echo, the quantization noise and other noise induced by network impairments such as idle circuit noise.

The non-linear quantization processor (24) does not have any effect on the updating of the filter coefficients in the echo estimator (6) by using the separate second subtracter (23) to obtain the second residual echo for the echo estimator (6). The introduction of the separate subtracters (7,23) can provide a non-linear quantization processor (24) which provides a wide range of candidates for completely cancelling both large echo and quantization noise, and an echo estimator (6) giving rapid convergence with a large adaptation speed.

The echo canceller (60) can achieve an excellent cancellation performance by introducing the non-linear quantization processor (24) and separate subtracters (7,23) having the discrete functions of transmitting the first residual echo and obtaining the second residual echo so as to update the filter coefficients in the echo estimator (6).

This invention is very effective as an echo canceller for cancelling both an echo having a wide range of levels and a large quantization noise with a rapid convergence in multi-linked PCM channels and/or low rate encoding channels. This invention is also very effective for other network impairments such as idle circuit noise and phase roll to maintain high cancellation performance. This superior performance makes it unnecessary to use a center clipper, or permits use of a center clipper having a very low clipping level, thereby avoiding the annoyance of the near-end talker's talkspurt.

Embodiment 2

Figure 7:
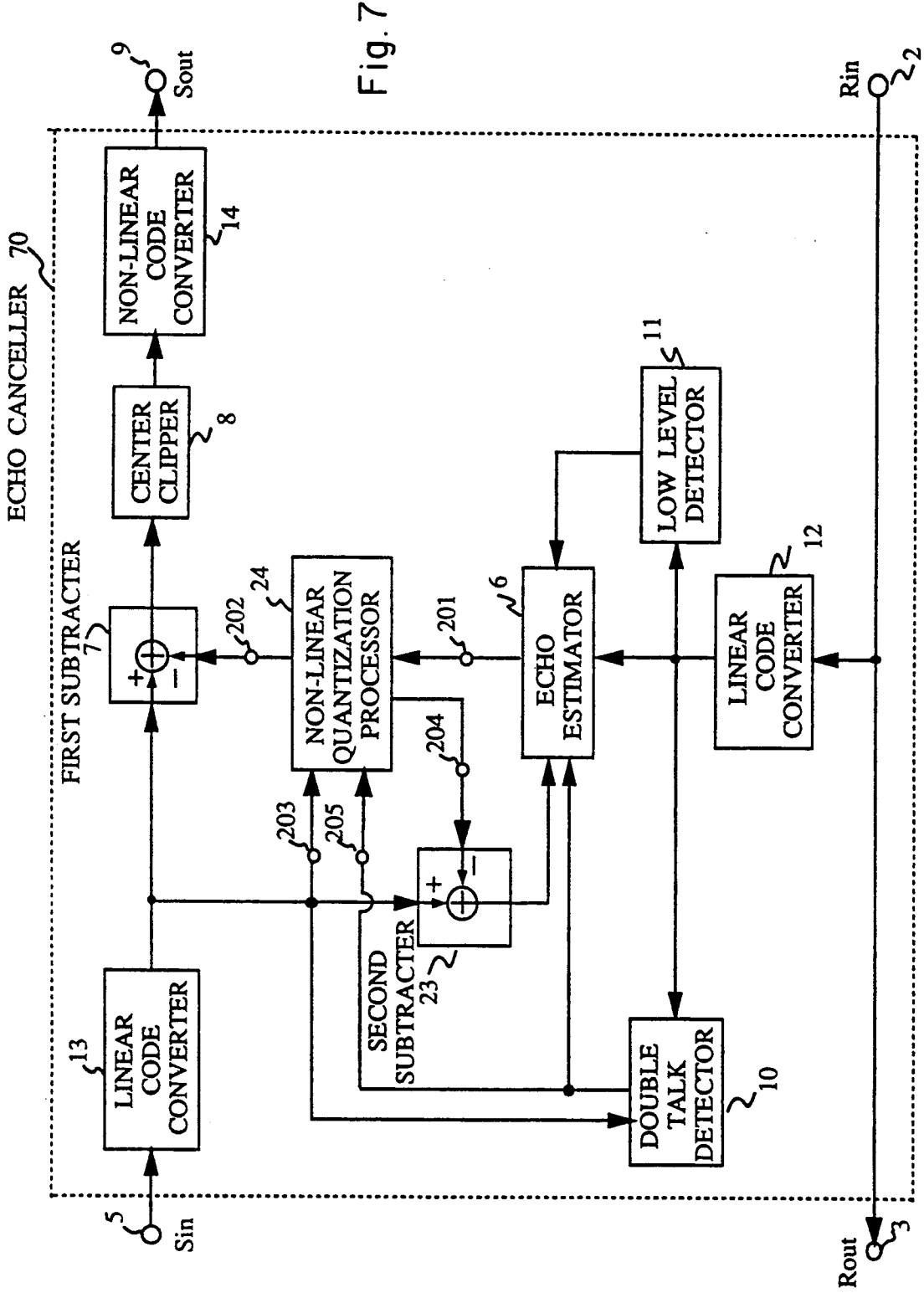
FIG. 7 is a functional configuration of an echo canceller (70) having a PCM interface according to another embodiment of the present invention.

In a second embodiment of the present invention, an echo canceller (70) in FIG. 7 can be effectively applied to an echo path having not only a one link PCM channel but also a multi-linked PCM channel in which a large quantization noise exists. The echo canceller (70) in FIG. 7 has the same configuration as that of Embodiment 1 except for the use of the quantized value of the echo estimate of the echo estimator (6) obtained through the port (204) from the non-linear quantization processor (24) in the second subtracter (23). In the echo canceller (60) in Embodiment 1, the echo estimate from the echo estimator (6) is directly used for the second subtracter (23). The same numerals as those in the preceding figures denote identical units.

In the echo canceller (70) of the present invention, under the convergence of the echo estimator (6), more accurate updating of the filter coefficients can be achieved for a lower level echo by subtracting the quantized echo estimate from the linear transmit input signal having particular discrete values with the quantization noise. This echo canceller (70) can therefore provide better performance for low level echo cancellation than the echo canceller (60) in the Embodiment 1.

Embodiment 3

Figure 8:
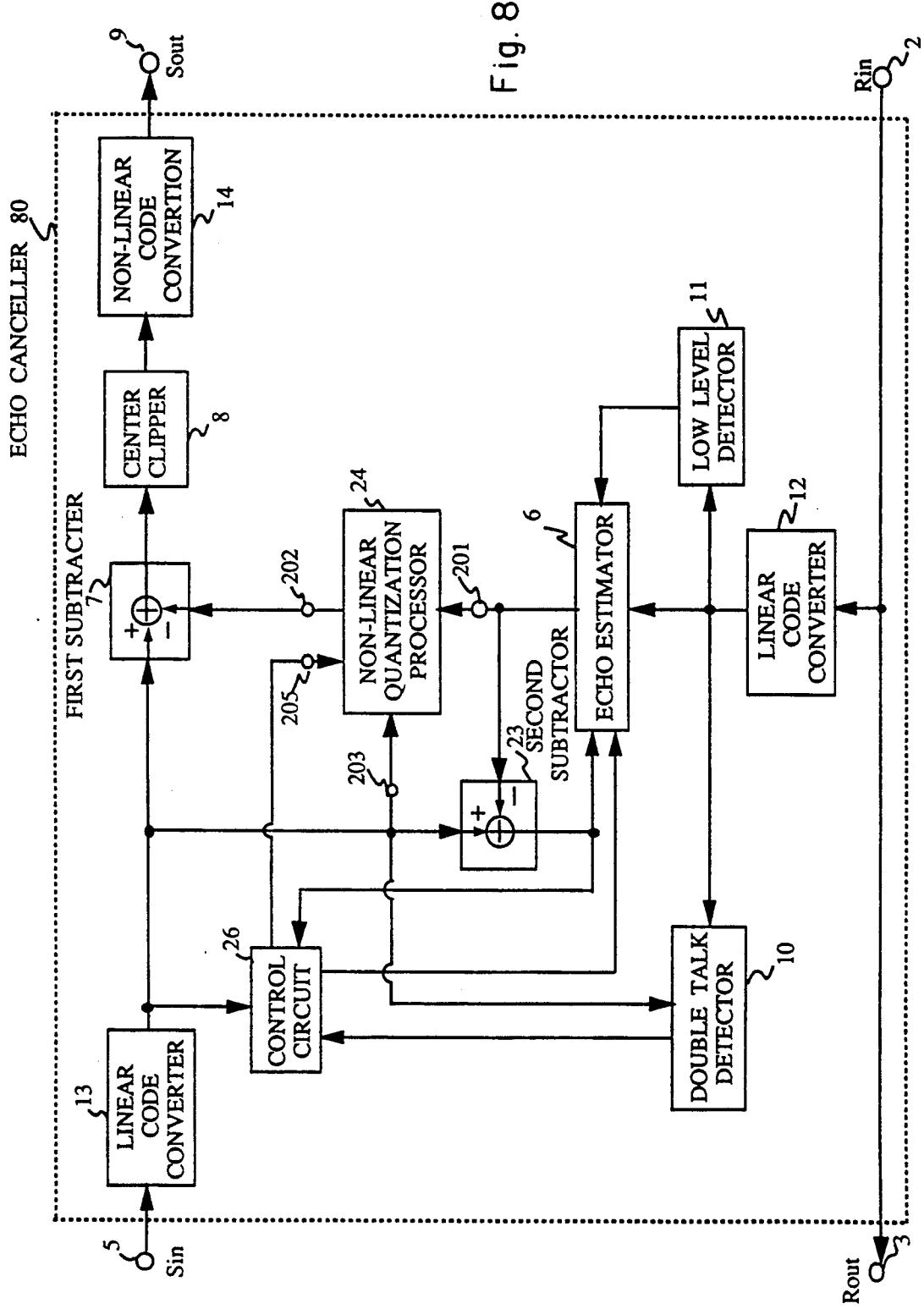
FIG. 8 is a functional configuration of an echo canceller (80) having a PCM interface according to another embodiment of the present invention.

In a third embodiment of the present invention, an echo canceller (80) shown in FIG. 8 is also applied to an echo path having a multi-linked PCM channel in which a large quantization noise exists. The same numerals as those in the preceding figures denote identical units. The same units are used in this embodiment except a non-linear quantization processor (24) and a control circuit (26) for the non-linear quantization processor (24) and the echo estimator (6). The non-linear quantization processor (24) provides an optimum echo estimate which minimizes the level of the first residual echo of the output of the first subtracter (7). The non-linear quantization processor (24) however prepares different quantization step sizes and/or different number of candidates in the multi-output non-linear quantizer (220) between the convergence and the divergence of the echo estimator (6). In the control circuit (26), the divergence/convergence of the echo estimator (6) is determined by the levels of the second residual echo and the linear transmit input signal to output a control signal to the non-linear quantization processor (24). A larger number of candidates and/or larger step sizes in the multi-output non-linear quantizer (220) are provided for the divergent echo estimator (6) than for the convergent echo estimator (6) so as to effectively cancel the echo and the quantization noise even by using the rough echo estimate from the echo estimator (6). The control circuit (26) also outputs a control signal to the echo estimator (6) to adjust the adaptation speed of the filter coefficients according to the convergence of the echo estimator (6).

In the double talk situation, it is necessary to avoid the annoying near-end talkspurt due to the non-linear quantization processor (24). Accordingly, the control circuit (26) also gives a control signal to the optimum echo estimate selector (221) in order to output the quantized echo estimate directly corresponding to the echo estimate of the echo estimator (6) as the optimum echo estimate.

This echo canceller (80) can also provide excellent and stable performance and rapid convergence under various conditions of large channel noise including multi-linked PCM quantization noise, during the initial stage for a hybrid circuit with a low ERL, and even during double talking.

Embodiment 4

Figure 9:
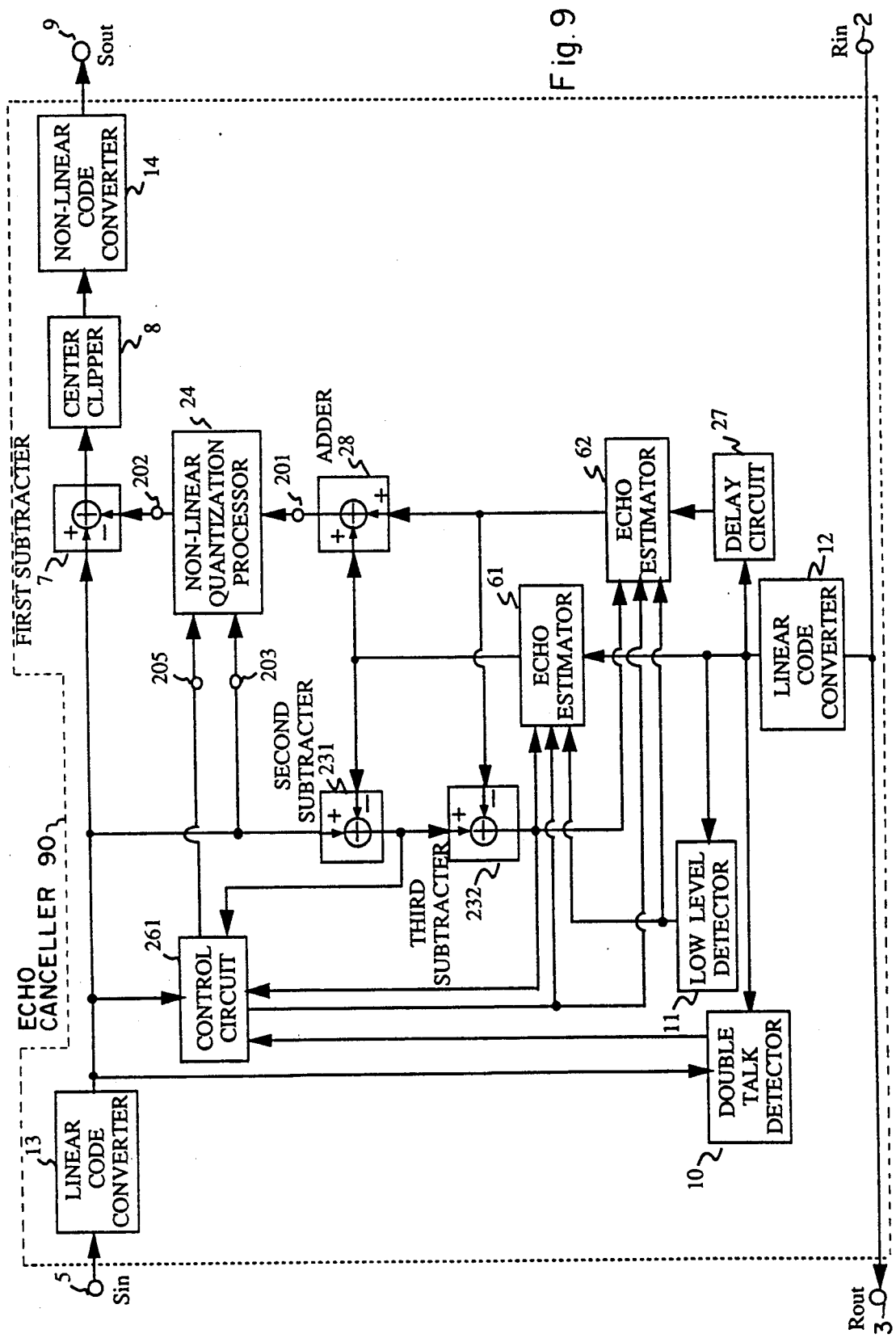
FIG. 9 is a functional configuration of an echo canceller (90) having a PCM interface according to another embodiment of the present invention.

In a fourth embodiment of the present invention, an echo canceller (90) shown in FIG. 9 is applied to an echo path having a long delay which cannot be fully covered by a single echo estimator (61). The same numerals as those in the preceding figures denote identical units. The non-linear quantization processor (24) also provides an optimum echo estimate which is chosen from candidates prepared under different conditions, depending on the convergence/divergence of the echo estimators (61) and (62) as in the non-linear quantization processor (24) described in the echo canceller (80). The subtracter (7) provides the first residual echo being transmitted to the far-end talker.

An adder (28) supplies an echo estimate through the port (201) to the non-linear quantization processor (24) after adding an echo estimate from the echo estimator (61) which covers a portion of the echo path delay to an echo estimate from an echo estimator (62) which covers the residual portion of the echo path delay. A delay circuit (27) has the same delay length as that in the echo estimator (61) for the linear receive input signal. A second subtracter (231) subtracts the echo estimate from the echo estimator (61) from the linear transmit input signal, and outputs a second residual echo to a control circuit (261) and a third subtracter (232) for obtaining a third residual echo. The filter coefficients in both the echo estimators (61) and (62) are updated by the third residual echo and the linear receive input signal.

The control circuit (261) controls the conditions prepared for candidates in the non-linear quantization processor (24) and the adaptation speeds in the echo estimators (61) and (62) according to the levels of the linear transmit input signal, second and third residual echoes, and state of the double talk detector (10).

In the double talk situation, it is necessary to avoid the annoying near-end talkspurt due to the non-linear quantization processor (24). Accordingly, the control circuit (261) gives a control signal to the optimum echo estimate selector (221) in order to output only the quantized echo estimate directly corresponding to the echo estimate of the output of the adder (28) as the optimum echo estimate. The output of the low level detector (11) is also fed to the echo estimator (61) and (62) to avoid the updating of the filter coefficients during a level of the linear receive input signal lower than a given threshold.

This echo canceller (90) can also provide excellent and stable performance and rapid convergence under various conditions of large channel noise including multi-linked PCM quantization noise in an echo path having a long delay.

Embodiment 5

Figure 10:
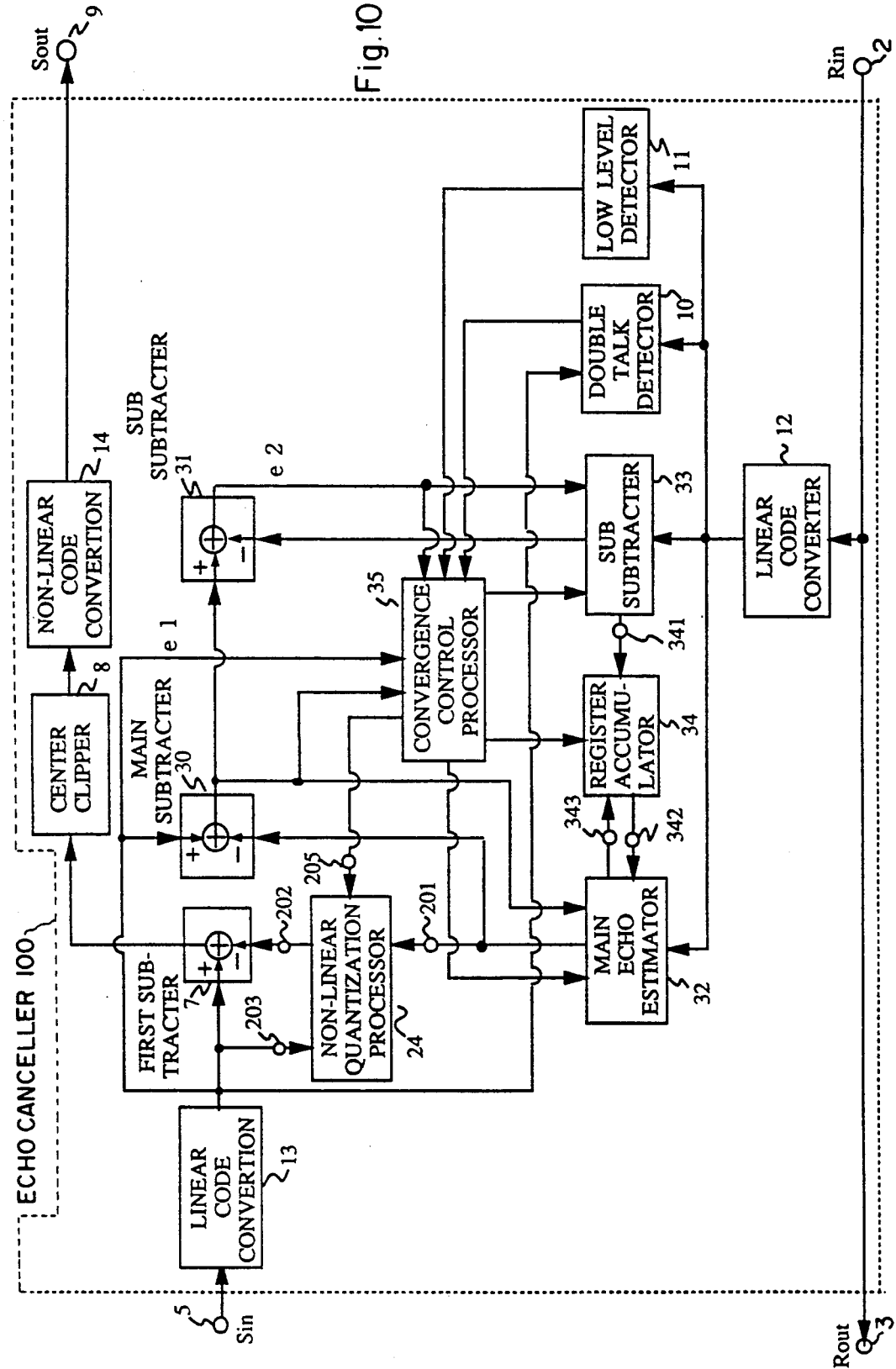
FIG. 10 is a functional configuration of an echo canceller (100) having a PCM interface according to another embodiment of the present invention.

In a fifth embodiment of the present invention, an echo canceller (100) shown in FIG. 10 is applied to an echo path having a multi-linked PCM channel in which a large quantization noise exists.

FIG. 10 shows the functional configuration of an echo canceller (100) according to a fifth embodiment of this present invention which can very rapidly cancel the echo and the quantization noise without any degradation in performance due to the double talking. The echo canceller (100) comprises two echo estimators, that is, a main echo estimator (32) and a sub echo estimator (33). The same numerals as those in the preceding figures denote identical units. A non-linear quantization processor (24) providing an optimum echo estimate for minimizing the level of the first residual echo of the output of the first subtracter (7) is also inserted between the first subtracter (7) and the main echo estimator (32). The first residual echo derived from the first subtracter (7) is transmitted through the center clipper (8) and/or the non-linear code conversion (14) as the transmit output signal. The functional configurations of these estimators (32,33) are the same as that of the echo estimator (6) in FIG. 5.

The main echo estimator (32) supplies a main echo estimate through the port (201) to the non-linear quantization processor (24) so as to generate candidates for the echo estimate having a quantization noise. The main subtracter (30) as a second subtracter outputs a main residual echo by subtracting it at a first input of the main subtracter (30) from the linear transmit input signal at a second input of the main subtracter (30). A convergence control processor (35) controls the main and sub echo estimators (32) and (33), a register accumulator (34) and the non-linear quantization processor (24), depending on the convergence/divergence of the sub echo estimator (33).

The main residual echo is also supplied to the sub subtracter (31) so as to obtain a sub residual echo by subtracting a sub echo estimate from it. The sub echo estimate is derived from the sub echo estimator (33). In the main echo estimator (32), an adaptation speed which is either very low or zero is used for coping with divergence due to double talking or channel noise disturbances, whereas an adaptation speed which is relatively high is applied in the sub echo estimator (33) so as to achieve rapid convergence.

Three control modes are provided in the convergence control processor (35), i.e. an ordinary mode, an adding mode and a reset mode. When the level of the sub residual echo is smaller than that of the main residual echo by at least a given threshold, the sub echo estimator (33) is judged to be convergent in the convergence control processor (35). As a result, the convergence control processor (35) chooses the adding mode in which each filter coefficient stored in a register in the sub echo estimator (33) is respectively added to the related filter coefficient stored in a register in the main echo estimator (32) by the register accumulator (34). After the coefficient addition, the register storing the filter coefficients of the sub echo estimator (33) is reset to an initial state, and then both echo estimators (32,33) are reoperated again in the ordinary mode. The addition of the coefficients in the adding mode can provide rapid convergence in the main echo estimator (32) even if a very slow adaptation speed is applied to it. The adaptation speed which is either zero or very low makes the main echo estimate (32) robust to the divergence, and it is not necessary to bypass the non-linear quantization processor (24) to avoid the influence of the divergence of the main echo estimator (32).

The non-linear quantization processor (24) is therefore always inserted to provide an optimum echo estimate for minimizing the level of the first residual echo. The optimum echo estimate is chosen from candidates derived from the main echo estimate, according to the control signal from the convergence control processor (35).

The operation of the echo canceller (100) will now be described in detail. The filter coefficients are stored in the register in the main echo estimator (32) so as to obtain the main echo estimate which is supplied to the non-linear quantization processor (24). The output of the main subtracter (30) as the main residual echo Re1 is fed back to the main echo estimator (32) for updating the filter coefficients in the main echo estimator (32) in the ordinary mode. The filter coefficients are stored in the register in the sub echo estimator (33) so as to obtain the sub echo estimate which is supplied to the sub subtracter (31). The output of the sub subtracter (31) as the sub residual echo Re2 is also fed back to the sub echo estimator (33) for updating the filter coefficients in the sub echo estimator (33) in the ordinary mode.

The non-linear quantization processor (24) is always inserted for these modes. In the convergence control processor (35), the mode is determined according to the convergent state of the sub echo estimator (33) by comparing the levels of the residual echoes Re1 and Re2 and the linear transmit input signal with reference to control signals from double talk and low level detectors (10,11), and the adaptation speeds are also chosen depending on the mode and these control signals.

In the convergent state in the sub echo estimator (33), the convergence control processor (35) outputs control signals to the register accumulator (34) and the main and sub echo estimators (32,33) so as to add the filter coefficients in the sub echo estimator (32) from a port (341) to the related filter coefficients in the main echo estimator (32) from a port (343). The addition of the coefficients in the convergent sub echo estimator (33) to the related coefficients in the main echo estimator (32) is expressed by;

$$Hm(i)|n+1 = r1*Hm(i)|n + r2*Hs(i)|n, \quad [7]$$

where r1 and r2 are constants in the range of $0 \leq r1$ and $r2 \leq 1$, i is the i-th tap position varying from 0 to $N-1$, $Hm(i)|n$ is the filter coefficient at the i-th tap in the main echo estimator (32) at the n-th sample index, and $Hs(i)|n$ is the filter coefficient at the i-th tap in the sub echo estimator (33) at the n-th sample index, respectively. After the addition, the register storing the filter coefficients in the sub echo estimator (33) is reset. The added coefficients are replaced in the main echo estimator (32) through a port (342). After these processes, both main and sub echo estimators (32,33) operate again in the ordinary mode for coefficient updating as does the echo estimator (6) in the conventional echo canceller (1).

In the ordinary mode, the updating of the coefficients in the main and sub echo estimators (32,33) is performed by using the linear receive input signal and the main residual echo Re1, and by using the linear receive input signal and the sub residual echo Re2, respectively.

When the sub echo estimator (33) is detected to be divergent by the convergence control processor (35), the mode becomes the reset mode, resulting in reset of the register in the sub echo estimator (33), and the mode is then switched to the ordinary mode. For other state in the sub echo estimator (33), in which it is difficult to clearly judge whether the estimator is convergent or divergent, the same ordinary procedures are performed in the estimators (32,33) as in the conventional echo canceller (1).

The adaptation speeds provided in the main echo estimator (32) are relatively lower than those in the sub echo estimator (33) so as not to cause the filter coefficients to diverge from the impulse response of the echo path even during double talking. On the other hand, a relatively fast adaptation speed is provided in the sub echo estimator (33) for achieving as rapid convergence for the echo as possible.

When the near- and far-end talkers are not in double talking, the level of the sub residual echo Re2 rapidly becomes smaller than that of the main residual echo Re1 in the case of the main echo estimator (32) having an impulse response which deviates from that of the echo path, resulting in repetition of the adding mode.

After the addition at the n-th sample index, Re1 at the n+1-th sample index becomes;

$$Re1(n+1) = SinL(n+1) - \sum_{i=0}^{N-1} Hm(i)|n+1*X(n+1-i), \quad [8]$$

$$= SinL(n+1) - \sum_{i=0}^{N-1} Hm(i)|n*X(n+1-i) - \sum_{i=0}^{N-1} Hs(i)|n*X(n+1-i), \quad [9]$$

and tends roughly to Re2(n). This means that the main echo estimator (32) can converge rapidly by the addition process using the fast adaptation in the sub echo estimator (33), even though the adaptation speed in the main echo estimator (32) is very low.

When the double talk situation or a low level of the linear receive input signal is detected, the adaptation speed is changed from a very low value to 0 in the main echo estimator (32) according to the control signals from the convergence control processor (35).

At the beginning of double talking, the filter coefficients in the sub echo estimator (33) are abruptly corrupted and caused to deviate due to the large step gain before the double talk detector (10) detects the double talk situation, and the divergence causes rapid increase of the sub residual echo Re2. However, there is no effect on the performance of the main echo estimator (32), because the very small step gain can prevent the coefficients from diverging in the main echo estimator (32), and the rapid detection of the divergent state of the sub echo estimator (33) by the convergence control processor (35) can also prohibit the coefficient addition. The sub echo estimator (33) is only reset to release the divergent coefficients. A stable main echo estimator (32) having an adaptation speed of zero or a very low value can always provide a suitable echo estimate for the non-linear echo quantization processor (24), maintaining rapid convergence by the addition process. During the activation of the low level detector (11), the addition process can be performed whenever the adding mode is chosen.

The echo canceller (100) comprising main and sub echo estimators (32,33) having the coefficient addition process, and separate subtracters (7,30) for the first residual echo transmitted to the far-end talker and for the second residual echo (the main residual echo) for updating filter coefficients in the main echo estimators (32) and the non-linear quantization processor (24), can achieve a better cancellation performance than the previous echo canceller (50) with regard not only to echo return loss enhancement but also to convergence speed and cancellation of quantization noise as described above. This is because the non-linear quantization process (24) does not have any influence on the main and sub echo estimators (32,33).

This echo canceller (100) can maintain excellent performance under various conditions of large channel noise including quantization noise, for low levels of the receive input signal, during the initial stage for a hybrid circuit with a low ERL, at the front-end of talkspurt after double talking, and even during double talking.

Embodiment 6

Figure 11:
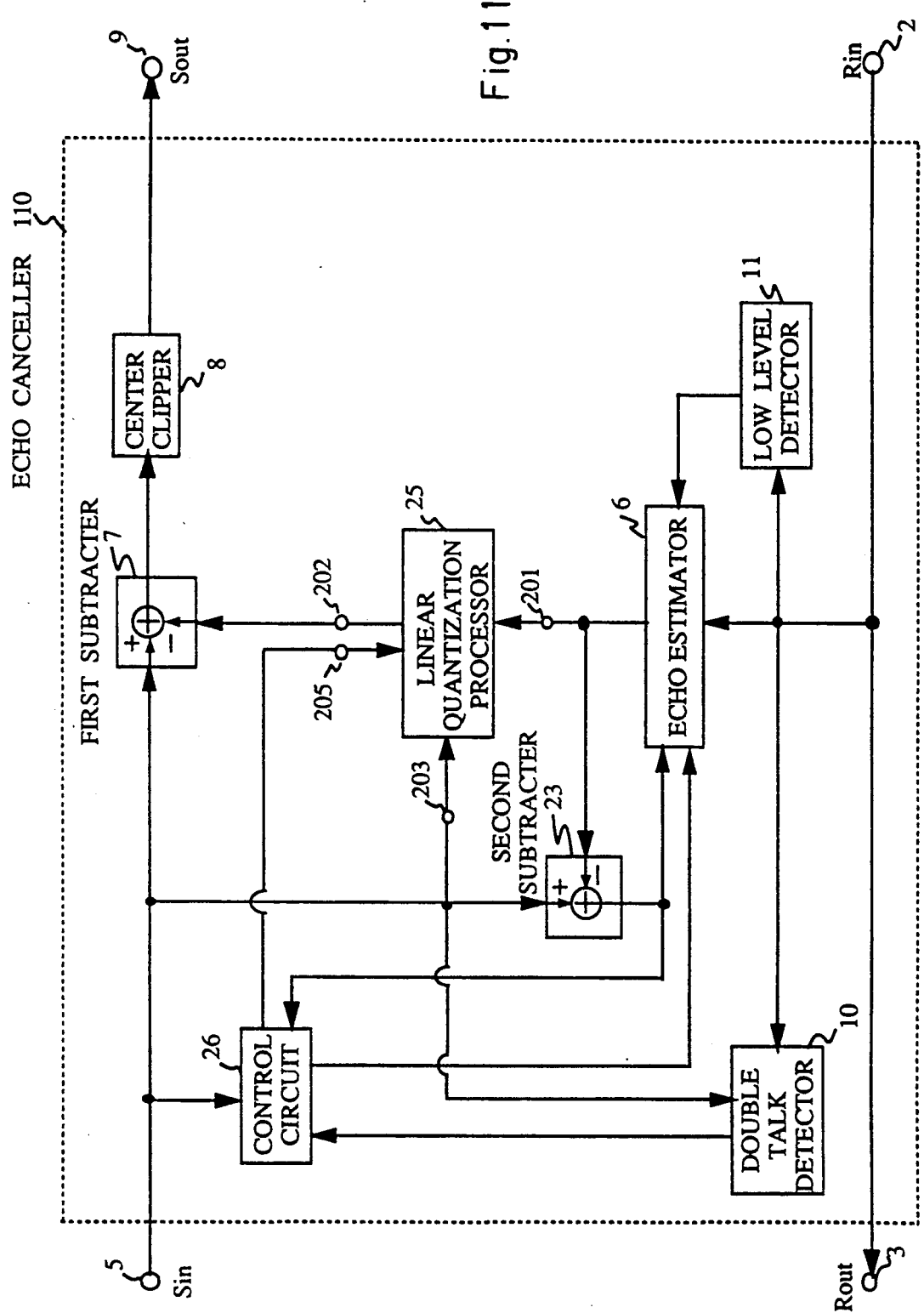
FIG. 11 is a functional configuration of an acoustic echo canceller (110) having a linear digital interface according to the present invention.

In a sixth embodiment of the present invention, an echo canceller (110) shown in FIG. 11 is applied to an echo path having an acoustic channel in which a large quantization noise induced by an A/D and D/A conversions with a short quantization bit to save the amount of the filter processing in the echo estimator (6) which must cover a long echo path delay. The same numerals as those in the preceding figures denote identical units. The same units are used in this embodiment except for a linear quantization processor (25) as in the echo canceller (80). The linear quantization processor (25) provides an optimum echo estimate which gives a minimum level of the first residual echo being transmitted to the far-end talker.

The same procedures in the acoustic echo canceller (110) are performed as that in the echo canceller (80). The difference is only in the linear quantization process (25) having linear quantization step sizes.

Figure 12:
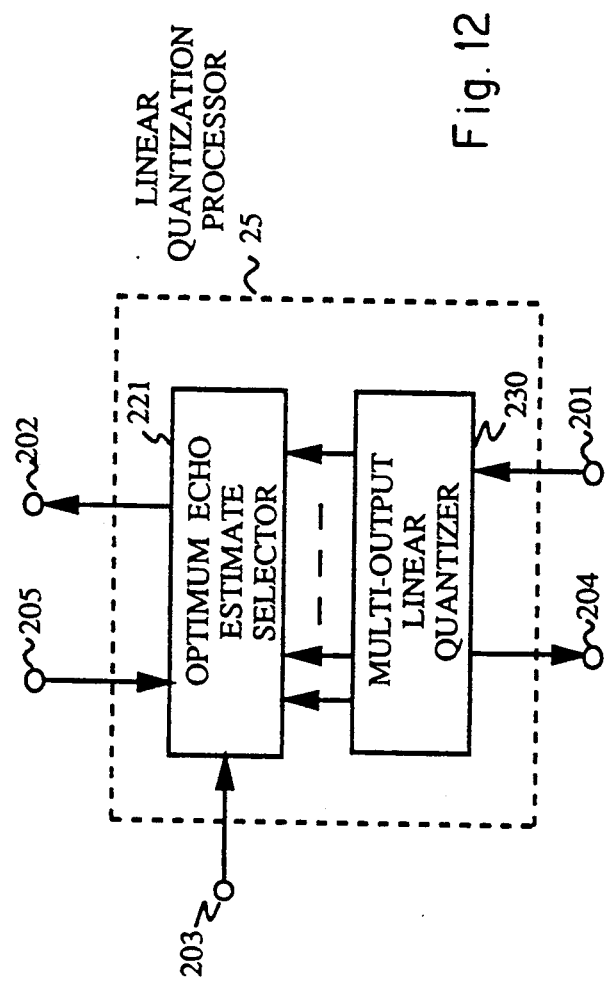
FIG. 12 is a functional configuration of a linear quantization processor (24) in the acoustic echo canceller (110).

The configuration of the linear quantization processor (25) in this embodiment is given in FIG. 12. The linear quantization processor (25) has inputs of the linear transmit input signal through the port (203) and the echo estimate supplied by the echo estimator (6) through the port (201). An optimum echo estimate is derived as the output of the linear quantization processor (25) from the port (202) which is connected to the first subtracter (7). The linear quantization processor (25) comprises a multi-output linear quantizer (230) and the optimum echo estimate selector (221). The multi-output linear quantizer (230) provides a plurality of quantized echo estimates for the optimum echo estimate selector (221) as candidates for the optimum echo estimate minimizing the level of the first residual echo. These candidates are prepared by using uniform quantization step sizes in the linear quantization.

The echo canceller (110) can achieve a higher cancellation performance by introducing the linear quantization processor (25), and separate subtracters for obtaining the first residual echo transmitted to the far-end talker, and the second residual echo for updating the filter coefficients in the echo estimator (6).

This invention is very effective as an acoustic echo canceller for cancelling both echo and large quantization noise for a filtering process having a large number of filter taps with a short processing bit length in the echo estimator (6) in acoustic channel applications such as audio conferences or TV conferences.

This invention is also applicable to other configurations described in U.S. patent applications Ser. No. 07/848,781 and Ser. No. 07/925,681 having a plurality of echo estimators by introducing separate subtracters for obtaining the first residual echo transmitted to the far-end talker and for obtaining the second residual echo for updating the filter coefficients.

The advantages of the present invention will now be summarized.

(1) In an echo canceller according to the present invention having separate subtracters (7,23) provided for obtaining the first residual echo transmitted to the far-end talker and for obtaining the second residual echo for updating filter coefficients in an echo estimator (6) and a quantization processor (24,25), not only excellent cancellation of echo having a wide range of levels and quantization noise in the linear transmit input signal, but also rapid convergence in cancellation of the echo by using a fast adaptation speed in the echo estimator (6), can be achieved in an echo path having either multi-linked PCM channels or low rate encoding channels.

(2) By using a non-linear quantization processor (24) in which an optimum echo estimate minimizing the level of the first residual echo derived from the first subtracter (7) can be chosen from a wide range of candidates, depending on the convergence of the echo estimator (6,32), both a large echo and the quantization noise can be drastically suppressed without any effect on the convergence speed of the echo estimator (6), thereby providing an excellent and stable echo return loss enhancement in multi-linked PCM channels and/or low rate encoding channels. This superior performance makes it unnecessary to use a center clipper, or permits use of a center clipper having a very low clipping level, thereby avoiding the annoyance of the near-end talker's talkspurt.

(3) In an echo canceller (100) according to the present invention using a plurality of echo estimators (32,33), wherein separate subtractions are made for obtaining residual echoes, the addition process for filter coefficients between the echo estimators and the quantization process for minimizing the level of the first residual echo can provide excellent performance regarding both large echo and quantization noise cancellation with rapid convergence and robustness to double talking and channel noise disturbances.

The present invention is applicable, for instance, to echo cancellers having PCM interfaces for telephone channels including PSTN and ISDN, for low rate encoding telephone channels including mobile communication networks, and for hand free telephones and teleconference equipment including TV phone, TV conference and audio conference devices.

From the foregoing, it will be apparent that the present invention constitutes a new and improved echo canceller. It should be understood of course that the embodiments disclosed are merely illustrative and are not intended to limit the scope of the invention. Reference should be made to the appended claims, therefore, rather than the specification as indicating the scope of the invention.

What is claimed is:

1. An echo canceller inserted in a four-wire circuit for cancelling an echo component in a transmit path comprising:

a first substracter inserted in said transmit path for substracting an optimum echo estimate at a first input of said first substracter from a linear transmit input signal at a second input of said first substracter so as to provide a first residual echo at an output of said first substracter which is a linear transmit output signal;

an echo estimator coupled with a receive path for synthesizing an echo estimate as an output from a linear receive input signal in said receive path by using an adaptive digital filter in said echo estimator;

a quantization processor, coupled with said echo estimator, for providing said optimum echo estimate based on said echo estimate of said echo estimator to said first substracter;

a second substracter, inserted for substracting either said echo estimate of the echo estimator or a quantized value of said echo estimate at a first input of said second substracter from said linear transmit input signal at a second input of said second substracter so as to provide a second residual echo at an output of said second substracter to said echo estimator; and a double talk detector coupled with said receive path to detect a double talk situation between near-end and far-end talkers, wherein filter coefficients of said adaptive digital filter in said echo estimator are updated according to said second residual echo at said output of said second substracter and said linear receive input signal in said receive path, said quantization processor includes a multi-output quantizer, which outputs a plurality of quantized echo estimates as candidates based on said echo estimate from said echo estimator, and an optimum echo estimate selector which chooses said optimum echo estimate minimizing a level of said first residual echo from said candidates supplied by said multi-output quantizer by comparing each of them with said linear transmit input signal, said double talk detector informs said quantization processor so as to output one of a) said echo estimate and b) a quantized value corresponding to said echo estimate from said echo estimator as said optimum echo estimate during double talking and informs said echo estimator so as to make an adaptation speed of said filter coefficients either very slow or zero during double talking.

2. An echo canceller according to claim 1, wherein;

a control circuit is inserted to control said quantization processor and said echo estimator, said quantization processor uses different conditions for preparing said candidates based on said echo estimate from said echo estimate according to a control signal determined by levels of said second residual echo and said linear transmit input signal and said status of said double talk detector in said control circuit, said echo estimator uses a different adaptation speed according to a control signal determined by levels of said second residual echo and said linear transmit input signal and said status of said double talk detector in said control circuit.

3. An echo canceller according to claim 2, wherein;

a delay circuit having the same delay as in said echo estimator is coupled with said receive path so as to delay said receive input signal, a second echo estimator is coupled with said delay circuit so as to compensate a capability of the echo estimation of said echo estimator which cannot cover a whole delay of an echo path, and synthesizes a second echo estimate, said second subtracter is cascaded by a third subtracter wherein a third residual echo is obtained by subtracting said second echo estimate from said second residual echo, said third residual echo is fed to both said echo estimator and said second echo estimator for updating said filter coefficients in said echo estimators, and also fed to said control circuit so as to control said quantization processor and said echo estimators, an adder is coupled with said quantization processor so as to add said echo estimate derived from said echo estimator to said second echo estimate derived from said second echo estimator, an output of said adder being fed to said quantization processor.

4. An echo canceller inserted in a four-wire circuit for cancelling an echo component in a transmit path comprising:

a first subtracter inserted in said transmit path for subtracting an optimum echo estimate at a first input of said first subtracter from a linear transmit input signal at a second input of said first subtracter so as to provide a first residual echo at an output of said first subtracter which is a linear transmit output signal, a main subtracter inserted for subtracting a main echo estimate at a first input of said main subtracter from said linear transmit input signal at a second input of said main subtracter so as to provide a main residual echo at an output of said main subtracter, a main echo estimator coupled with a receive path for synthesizing said main echo estimate as an output from a linear receive input signal in said receive path by using an adaptive digital filter in said main echo estimator, a sub subtracter coupled with said main subtracter for subtracting a sub echo estimate from said main residual echo so as to output a sub residual echo, a sub echo estimator coupled with said receive path for synthesizing said sub echo estimate as an output from said linear receive input signal in said receive path by using an adaptive digital filter in said sub echo estimator, a quantization processor coupled with said main echo estimator for providing said optimum echo estimate at the first input of said first subtracter based on said main echo estimate from said main echo estimator, and a register accumulator for adding each filter coefficient of said adaptive filter at a tap position in said sub echo estimator to a filter coefficient of said adaptive filter at the same tap position in said main echo estimator, a convergence control processor for controlling said main echo estimator, said sub echo estimator, said register accumulator (34) and said quantization processor according to the state of at least said sub echo estimator, a double talk detector coupled with said receive path so as to detect a double talk situation between near-end and far-end talkers, wherein;
said convergence control processor chooses an operation mode from an ordinary mode, an adding mode, or a reset mode according to the state of said sub echo estimator determined by levels of at least said main residual echo and said sub residual echo, said adding mode is chosen in a convergence state of said sub echo estimator wherein the level of said sub residual echo is smaller than that of said main residual echo by at least a given threshold, said reset mode is chosen in a divergence state of said sub echo estimator wherein the level of said sub residual echo is larger than that of said main residual echo by at least a given threshold, and said ordinary mode is chosen when said sub echo estimator does not converge or diverge, and wherein in said ordinary mode, filter coefficients of said adaptive digital filter in said sub echo estimator are updated according to said sub residual echo and said linear receive input signal, and filter coefficients of said adaptive digital filter in said main echo estimator are updated according to said main residual echo and said linear receive input signal, in said reset mode, filter coefficients in said sub echo estimate are reset, in said adding mode, each filter coefficient of said adaptive filter at a tap position in said sub echo estimator is added to the filter coefficient of said adaptive filter at the same tap position in said main echo estimator, and then said filter coefficients of said adaptive filter in said sub echo estimator are reset, and wherein said quantization processor includes a multi-output quantizer, which outputs a plurality of quantized echo estimates as candidates based on said main echo estimate from said main echo estimator, and an optimum echo estimate selector which chooses said optimum echo estimate minimizing the level of said first residual echo from said candidates by comparing each of them with said linear transmit input signal, and wherein said double talk detector informs said quantization processor to output the quantized value of said main echo estimate as said optimum echo estimate during double talking, and informs said convergence control processor to make adaptation speeds of said filter coefficients in said main echo estimator and said sub echo estimator slow or zero during double talking.

5. An echo canceller according to any of claims 1–3, wherein a low level detector for said linear receive input signal is coupled with said receive path to control said adaptation speed in said echo estimator, said second echo estimator or said main echo estimator and to control said adaptation speed in said sub echo estimator, and to control said quantization processor so as to output said quantized echo estimate as said optimum echo estimate corresponding to said echo estimate from said echo estimator or corresponding to said main echo estimate from said main echo estimator.

6. An echo canceller according to any of claims 1–3, wherein a center clipper is provided for clipping said first residual echo when it has a small level.

* * * * *